No. 778,556.

Patented December 27, 1904.

UNITED STATES PATENT OFFICE.

SAMUEL LEWIS SUMMERS, OF PHILADELPHIA, PENNSYLVANIA.

PROCESS OF MAKING ACETYL-SALICYL-PHENETIDIN.

SPECIFICATION forming part of Letters Patent No. 778,556, dated December 27, 1904.

Application filed April 11, 1904. Serial No. 202,635.

*To all whom it may concern:*

Be it known that I, SAMUEL LEWIS SUMMERS, a citizen of the United States, residing in the city of Philadelphia, State of Pennsylvania, have invented certain new and useful Improvements in Processes of Producing Acetyl-Salicyl-Phenetidin, of which the following is a full, clear, and exact description.

My invention relates to a new process for producing acetyl-salicyl-phenetidin, a chemical product invented by me and described in Letters Patent No. 706,356 granted to me, dated August 4, 1902. The said product is the crystalline derivative having the chemical formula $C_{17}H_{17}NO_4$, resulting from the reaction of acetic acid and salicylic acid on phenetidin as the base. In said patent I described and claimed a process of producing it, which consisted in preparing a salicyl-phenetidin compound and then acetylizing this by means of acetic anhydrid.

My present and newly-invented process consists, speaking generally, in preparing a compound of acetic acid and salicylic acid and using this as an acetylizing agent, so to speak, causing it to react on para-amido-phenetol, the resultant crystals being then purified by washing or recrystallizing from ethylic alcohol, chloroform, or other suitable solvent.

In carrying out my new process practically I first make a pure acetyl-salicylic-acid compound from one hundred and two parts, by weight, of anhydrous acetic acid and one hundred and thirty-eight parts, by weight, of salicylic acid. Of this compound I take one molecule or one hundred and eighty parts, by weight, and combine it with one hundred and thirty-seven parts, by weight, of para-phenetidin, adding just enough xylene to dissolve the mixture when heated to its boiling-point. The resultant solution desired is then obtained by heating the mass in an autoclave to a temperature of about 150° centigrade for a period of about six hours. It is then allowed to cool, and the desired crystalline derivative is then separated from the condensation which takes place by washing or recrystallizing from ethylic alcohol, chloroform, or other suitable volatile solvent. The resultant crystals have the chemical formula $C_{17}H_{17}NO_4$, are pure white, tasteless, and form in needle-like structures, rather than in plates, as do many phenetidin compounds, and are completely soluble in alcohol, ether, benzin, and chloroform. The product does not differ substantially from the product described in my said former patent; but my new process hereinabove described for producing it has the advantages of simplicity and economy, is more direct, and productive of greater certainty in the results sought for.

Having thus described my invention, what I claim as new, and desire to secure by Letters Patent, is—

The process described for producing acetyl-salicyl-phenetidin, which consists in causing an acetyl-salicylic-acid compound to react on para-phenetidin, in the presence of xylene as a solvent; heating the admixture until it dissolves, then allowing it to cool and separating the resultant formed crystals from the liquor of condensation, and finally purifying the resultant crystalline product; substantially as described.

In testimony whereof I have hereunto affixed my signature this 5th day of April, A. D. 1904.

SAMUEL LEWIS SUMMERS.

Witnesses:
B. F. TAPPAN,
MAE F. NAHILL.